(12) United States Patent
Liu et al.

(10) Patent No.: US 11,612,945 B2
(45) Date of Patent: Mar. 28, 2023

(54) BLANKING MACHINE AND BLANKING METHOD FOR BAR OR PIPE MATERIAL

(71) Applicant: XI'AN JIAOTONG UNIVERSITY, Xi'an (CN)

(72) Inventors: Jian-Kang Liu, Xi'an (CN); Ou-Meng Song, Xi'an (CN); De-Fei Xu, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/316,660

(22) Filed: May 10, 2021

(65) Prior Publication Data
US 2021/0354217 A1   Nov. 18, 2021

(30) Foreign Application Priority Data

May 15, 2020 (CN) .......................... 202010414125.4

(51) Int. Cl.
   *B23D 21/04*   (2006.01)
(52) U.S. Cl.
   CPC .................................... *B23D 21/04* (2013.01)
(58) Field of Classification Search
   CPC ........ B23D 21/00; B23D 21/04; B23D 31/02; B21J 13/04; B21J 13/06; B21J 13/14
   USPC .......................................................... 83/39
   See application file for complete search history.

(56) References Cited

U.S. PATENT DOCUMENTS

| 5,542,278 | A | * | 8/1996 | Aleksandrovich | ......... B21J 1/04 72/371 |
| 2003/0150315 | A1 | | 8/2003 | Lin | |
| 2009/0188113 | A1 | * | 7/2009 | McKeeth | ............. B23D 21/003 30/106 |
| 2011/0192262 | A1 | * | 8/2011 | Loveless | ............. B23D 59/006 55/482 |
| 2021/0146426 | A1 | * | 5/2021 | Stroud | ....................... B21J 7/14 |

FOREIGN PATENT DOCUMENTS

| CN | 104001784 | | 8/2014 | | |
| CN | 106141053 | | 11/2016 | | |
| CN | 106141053 | A | * | 11/2016 | |
| CN | 109201990 | A | * | 1/2019 | ............. B21J 13/04 |
| CN | 110315020 | | 10/2019 | | |
| CN | 110315020 | A | * | 10/2019 | ............... B21J 7/14 |
| CN | 210475163 | | 5/2020 | | |
| DE | 102017214961 | A1 | * | 9/2018 | ............. B21J 13/03 |

\* cited by examiner

*Primary Examiner* — Nhat Chieu Q Do

(57) ABSTRACT

A blanking machine and a method for blanking a bar or pipe material are provided. The blanking machine includes a blanking assembly and a plurality of driving members. The blanking assembly includes a housing, a plurality of pairs of slide rails, and a plurality of striking blocks. The housing defines a plurality of radially distributed grooves. The pairs of slide rails are respectively installed in the grooves. The striking blocks are respectively slidably installed on the pairs of slide rails. The driving members are configured to respectively drive the striking blocks to reciprocate along the slide rails to strike a material to be processed.

12 Claims, 10 Drawing Sheets

BLANKING MACHINE AND BLANKING METHOD FOR BAR OR PIPE MATERIAL

CROSS-REFERENCE TO RELATED APPLICATION

This application claims priority of China Patent Application No. 202010414125.4, filed on May 15, 2020, entitled "BLANKING MACHINE AND BLANKING METHOD FOR BLANKING BAR OR PIPE MATERIAL," the content of which are hereby incorporated by reference in its entirety.

FIELD

The disclosure relates to the field of bar or pipe material processing, and in particular to a blanking machine and a blanking method for a bar, a pipe, or the like.

BACKGROUND

Metal bars, pipes, and the like, as important raw materials and components, are in great demand and have wide applications in machinery manufacturing and industrial production. Blanking methods for the metal bars, pipes, and the like are widely used in productions of rotating components and components that are matched with the rotating components, such as inner and outer rings of bearings, rollers of rolling bearings, retaining rings, pins of metal chains, standard pins, shafts, etc. Articles for producing these components are obtained by cutting metal bars or pipes for multiple times. Conventional blanking methods mainly refer to cutting and shearing. The cutting methods include saw cutting, pipe cutter cutting, rotary wedge cutting, laser cutting, etc. The shearing methods include coreless rod shearing, cored rod shearing, cored rod circumferential shearing, etc. Although the blanking methods, such as the lathe cutting and the saw cutting, can be used to obtain a flat cut surface, they both have disadvantages such as low production efficiency and waste of raw materials. The shearing methods require a great shearing force and consume great energy, and the sheared surfaces of the sheared rods are non-flat. In order to meet the requirements of the subsequent process such as cold extrusion, a secondary machining process, such as a turning process, is needed to flatten the sheared surface after the shearing. That is, the conventional rod or pipe cutting method may have problems of wasting raw materials, loud noise, and long burrs; the blanks produced by the conventional rod or pipe shearing method may have relatively large deformations, which cannot meet the precision requirements of the shape. The conventional blanking methods for the metal bar or pipe materials would lead to material loss and have low production efficiency, and thus is not suitable for mass production and is not environmentally friendly.

SUMMARY

The present disclosure provides a blanking machine and a blanking method for a bar or pipe material. The present disclose aims to solve one or more of the above-described problems existed in the conventional blanking machines, such as the low blanking efficiency, the uneven force applied on the bar or pipe material in blanking, the large cross-sectional deformation of the blank, the need for secondary machining of the blank, the production of metal scraps, the waste of raw materials, and the high energy consumption in the blanking.

A blanking machine includes a blanking assembly and a plurality of driving members.

The blanking assembly includes a housing, a plurality of pairs of slide rails, and a plurality of striking blocks. The housing defines a plurality of radially distributed grooves. The pairs of slide rails are respectively installed in the grooves. The striking blocks are respectively slidably installed on the pairs of slide rails. The driving members are configured to respectively drive the striking blocks to reciprocate along the slide rails to strike a material to be processed.

An end of the striking block is a striking head having a rectangular striking surface. A width of the rectangular striking surface is 5%-10% of a size of a body of the striking block along the same direction as the width of the rectangular striking surface.

In an embodiment, the blanking machine further includes a base, wherein the blanking assembly and the driving member are both mounted on the base.

In an embodiment, a lower part of the housing is provided with an opening, a drawer is installed in the base, and an upper surface of the base is provided with a collection port located below the opening.

In an embodiment, the grooves are evenly distributed along a circumferential direction of the housing. In an embodiment, the grooves are radially extended from a center of the housing; three grooves are communicated with each other at the center of the housing.

In an embodiment, each driving member includes a motor and a transmission assembly. The transmission assembly includes an input transmission shaft coupled to the motor, an input gear mounted on the input transmission shaft, an output gear meshed with the input gear, and an eccentric output assembly mounted on the output gear, hinged with the striking block through a pin. The motor is configured to drive the striking block through the eccentric output assembly to reciprocatingly move the striking block in the groove.

In an embodiment, the eccentric output assembly includes an eccentric, an eccentric connecting rod, and an output transmission shaft. One end of the output transmission shaft is fixedly connected to the output gear, and another end of the output transmission shaft is fixedly connected to the eccentric. One end of the eccentric connecting rod is rotatably sleeved outside the eccentric, and another end of the eccentric connecting rod is hinged with the striking block through the pin. In an embodiment, the housing has a disc shape and includes a front cover and a rear cover, the three grooves are defined in the front cover; the rear cover fixes the position of the eccentric output assembly. In an embodiment, the output transmission shaft extends in an axial direction of the front cover, protrudes out from the rear cover through a through hole, and is rotatable with respect to rear cover. In an embodiment, the eccentric output assembly is located adjacent to the circumference of the front cover, and the striking block is located adjacent to the center of the front cover.

A method for blanking a bar or pipe material based on the blanking machine, including following steps:

pre-scoring a bar or pipe material with a V-shaped notch along the circumference of an outer surface of the bar or pipe material;

placing the bar or pipe material at the center of a circle defined by the plurality of striking blocks;

allowing the plurality of driving members to drive the plurality of striking blocks to strike one end of the bar or pipe material in sequence at the same time interval and at a relatively high frequency, so that cracks are initiated at the V-shaped notch of the bar or pipe material and expanded until the bar or pipe material is fractured.

In an embodiment, the depth of the V-shaped notch is ranged from 0.5 mm to 1 mm.

In an embodiment, the frequency of the striking is ranged from 40 Hz to 60 Hz.

In the present disclosure, the bar or pipe material is subject to only one direction striking force at one time and is subject to uniformly cycling stresses. The striking head has a tapered polyhedron with multiple faces, which reduces the contact area when striking the bar or pipe material, maximizing the distance between the struck position of the bar or pipe material and the V-shaped notch, and thereby maximizing the force applied to the V-shaped notch, promoting the rapid initiation and steady extension of microcracks in the bar or pipe material until the bar or pipe material is fractured. It is ensured that the bar or pipe material is less deformed at the struck position, has a flat fracture surface, and is retained with high straightness of the bar or pipe material, thereby achieving precise separation and avoiding secondary processing caused by unqualified blanking quality. The fatigue fracture blanking method has a high blanking efficiency, no waste generated, and high utilization of raw materials, which is an environmentally friendly and pollution-free method. The blanking machine has the advantages of simple structure, wide blanking range, low energy consumption, economy, and practicality.

Further, the blanking assembly and the driving member both mounted on the base provide good integrity.

Further, the collection port can be located below the V-shaped opening, so that the bar or pipe sections separated from the bar or pipe material can fall through the V-shaped opening and enter the drawer through the collection port.

DETAILED DESCRIPTION

Figure 1:
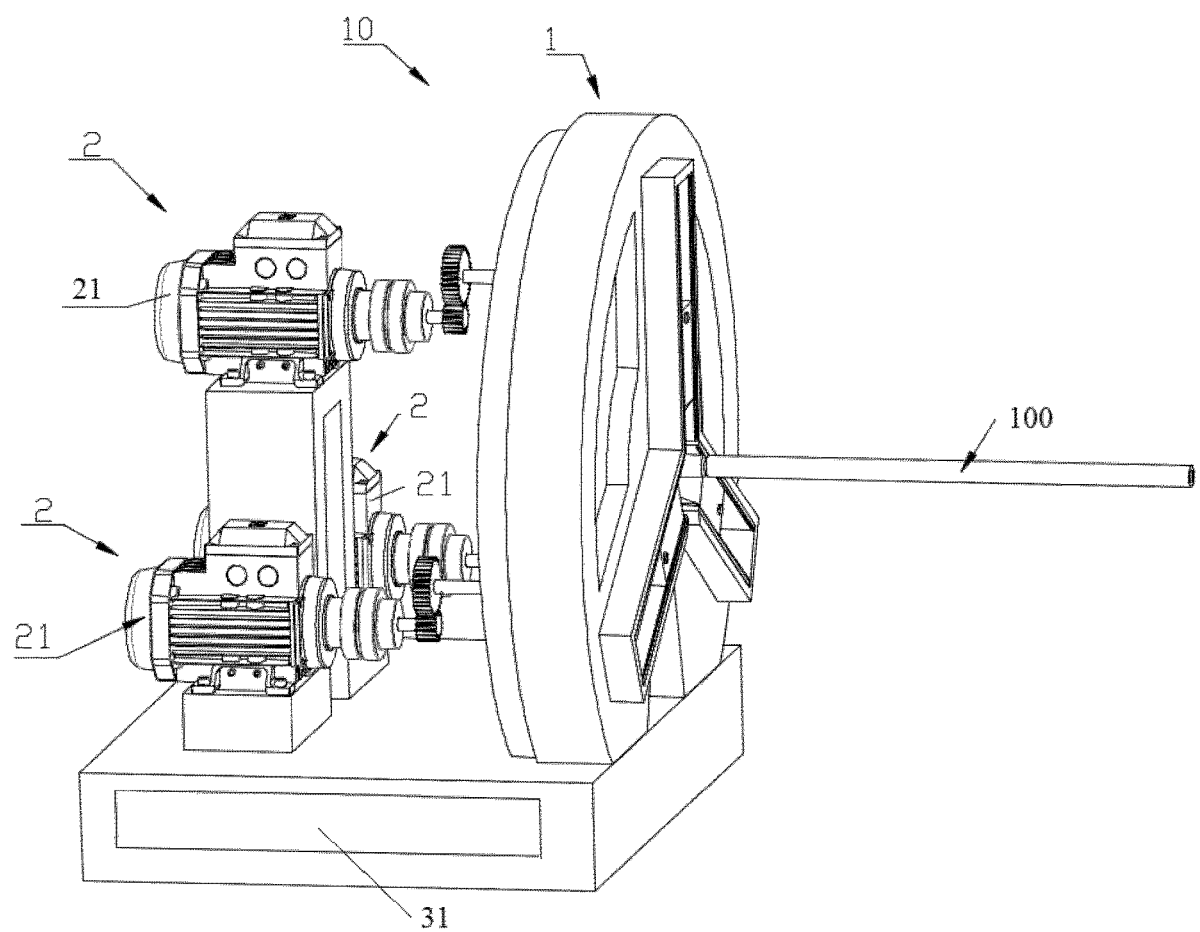
FIG. 1 is a schematic perspective view of a blanking machine in an embodiment of the present disclosure.

In order to make the purpose, technical solutions, and advantages of the embodiments of the present disclosure clearer, the technical solutions in the embodiments of the present disclosure will be described clearly and completely in conjunction with the accompanying drawings in the embodiments of the present disclosure. Obviously, the described embodiments are some, but not all, of the embodiments of the present disclosure. Generally, the components in the embodiments of the present disclosure described and shown in the drawings herein may be arranged and designed in various different configurations.

Therefore, the following detailed description of the embodiments of the present disclosure provided in the accompanying drawings is not intended to limit the scope of the present disclosure, but merely represents specific embodiments of the present disclosure. Based on the embodiments in the present disclosure, all other embodiments obtained by those of ordinary skill in the art without creative work shall fall within the protection scope of the present disclosure.

It should be noted that similar reference numerals and letters indicate similar items in the drawings. Therefore, once a certain item is defined or described in the description corresponding to one drawing, the item with the same reference numeral or letter does not need to be repeatedly defined and explained in the description corresponding to the subsequent drawings.

In the description of the embodiments of the present disclosure, it should be understood that the orientations or positional relationships indicated by the terms "center", "upper", "lower", "left", "right", "vertical", "horizontal", "inner", "outer" is the orientations or positional relationships based on the orientations or positional relationships shown in the drawings, or the orientations or positional relationships generally configured when using the present product, or is the orientations or positional relationships commonly understood by those skilled in the art. They are only for the convenience of describing the present disclosure and simplifying the description, rather than indicating or implying that the device or element referred to must have a specific orientation or must be constructed and operated in a specific orientation, and thus cannot be construed as a limitation to the present disclosure.

In addition, the terms "first", "second", and the like are only used for distinguishing one element having a certain name from another element having a same name, and cannot be understood as indicating or implying relative importance.

It should be noted that the embodiments in the present disclosure and the features in the embodiments can be combined with each other as long as there is no conflict.

The technical solution in this present disclosure will be described below with reference to the accompanying drawings.

The present disclosure provides a blanking machine. The blanking machine may be used to solve one or more problems existed in conventional blanking machines, such as the low blanking efficiency, the uneven force applied on the bar or pipe material in blanking, the large cross-sectional deformation, the need for secondary machining of the blank, the production of scraps, the waste of raw materials, the high energy consumption in the blanking, and the environmental unfriendliness.

Figure 2:
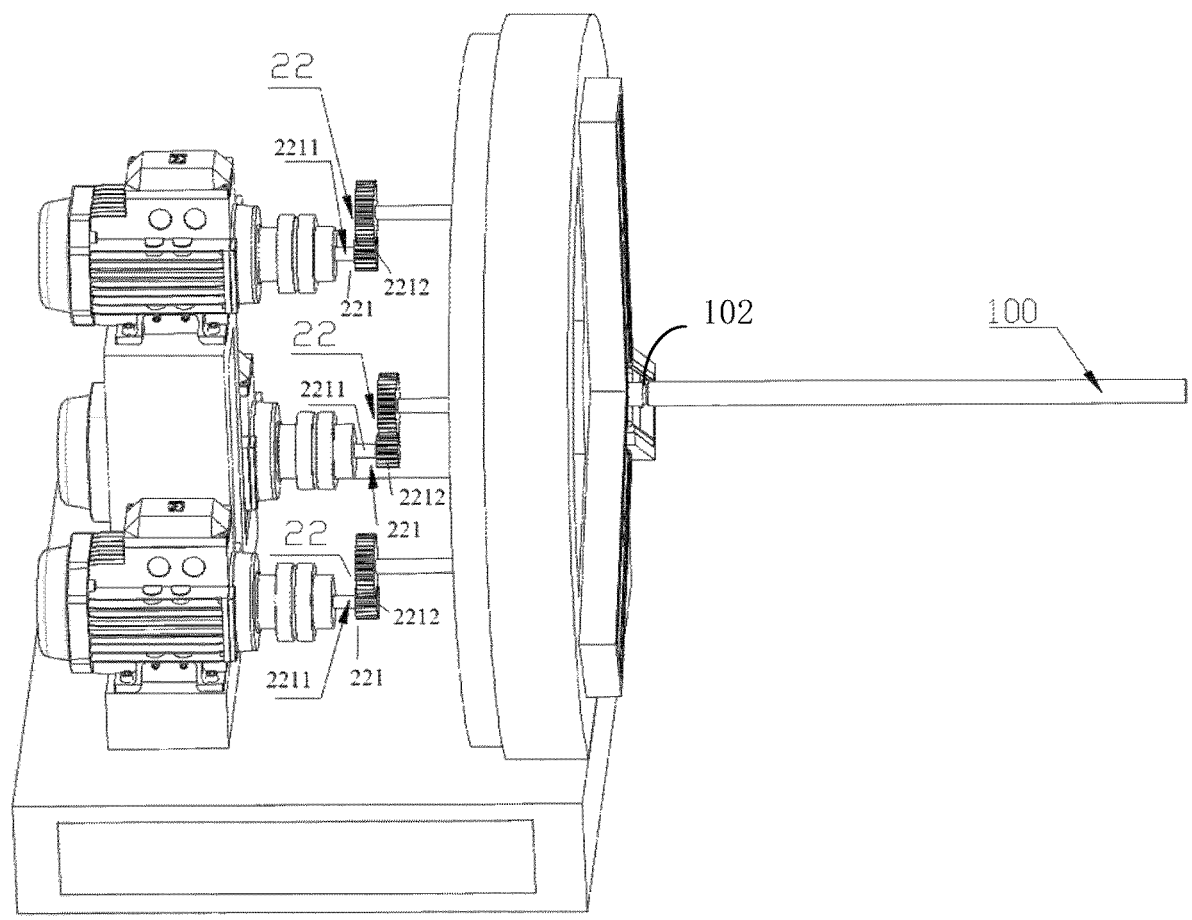
FIG. 2 is a schematic perspective view of the blanking machine in the embodiment of the present disclosure from another angle of view.

Referring to FIGS. 1 and 2, in an embodiment, the blanking machine 10 includes a blanking assembly 1, three driving members 2, and a base 3. The blanking assembly 1 and the three driving members 2 are mounted on the base 3.

Figure 3:
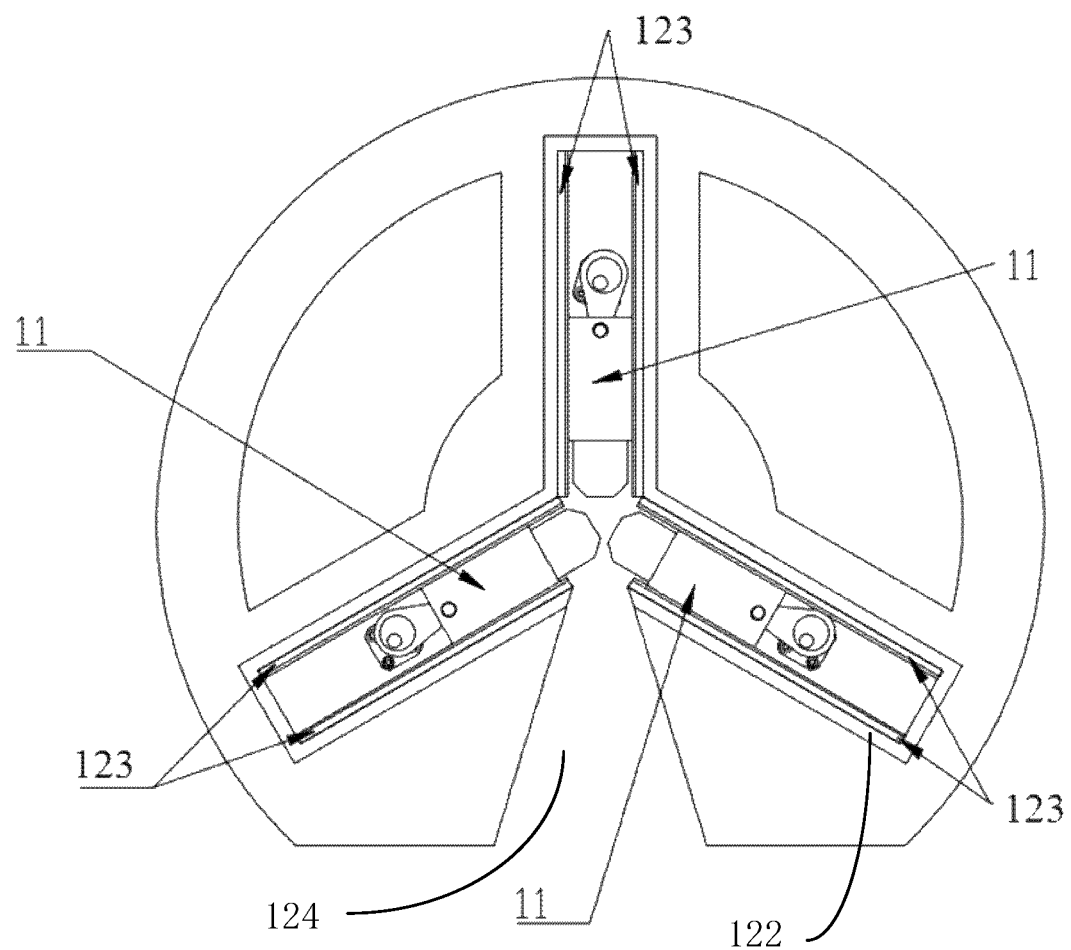
FIG. 3 is a schematic front view of a blanking assembly in the embodiment of the present disclosure.
Figure 4:
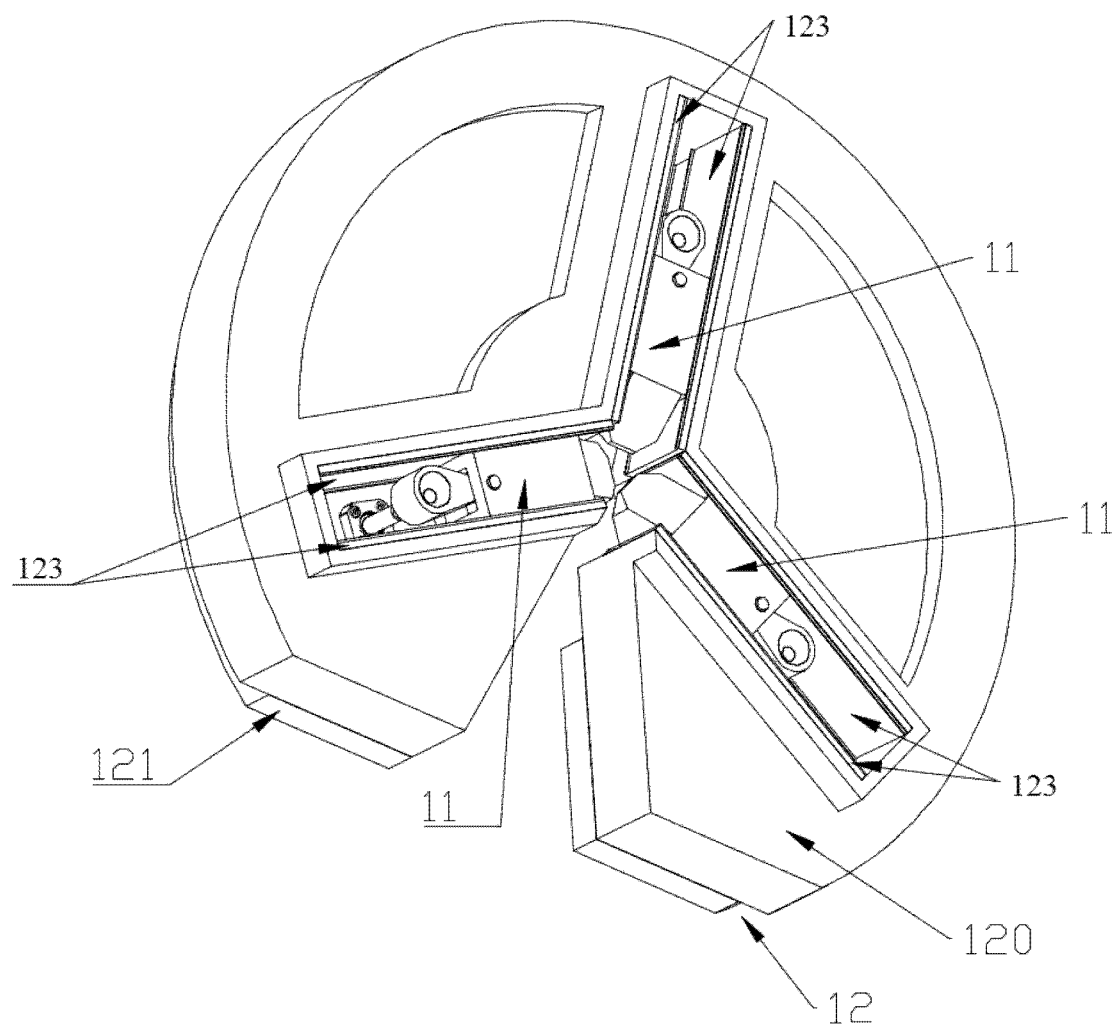
FIG. 4 is a schematic perspective view of the blanking assembly in the embodiment of the present disclosure.
Figure 5:
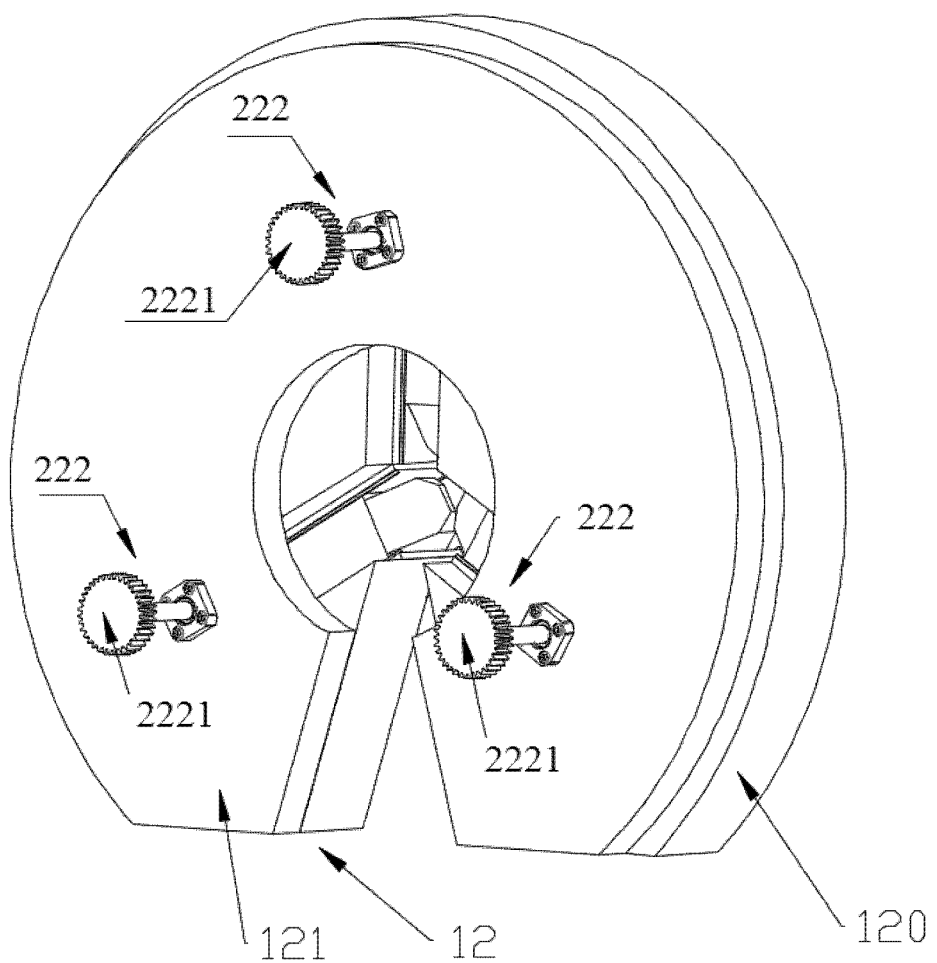
FIG. 5 is a schematic perspective view of the blanking assembly in the embodiment of the present disclosure from another angle of view.

Referring also to FIGS. 3, 4 and 5, the blanking assembly 1 includes a housing 12 and three striking blocks 11. The housing 12 has a disc shape and includes a front cover 120 and a rear cover 121. The front cover 120 is provided with three grooves 122 radially extended from the center of the front cover 120. The three grooves 122 are communicated with each other at the ends thereof at the center of the front cover. The grooves 122 can be through grooves 122 and can be identical in width and length. The hollow center defined by the three communicated grooves 122 has a size that is capable of having an end of the bar or pipe material 100 inserted therein. The angle between each two adjacent grooves 122 is 120 degrees. That is, the three grooves 122 are distributed into three equal parts along the circumference of the front cover 120. The three striking blocks 11 are respectively located in the three grooves 122.

The three driving members 2 are configured to respectively drive the three striking blocks 11. The three driving members 2 are located adjacent to the rear cover 121 of the housing 12. The locations of the three driving members 2 respectively correspond to the locations of the three striking blocks 11. Referring to FIGS. 1 and 3, when one end of the bar or pipe material 100 is inserted into the hollow center of the housing 12, the three striking blocks 11 are located in radial directions of the bar or pipe material 100. Driven by the three driving members 2, the three striking blocks 11 strikes the bar or pipe material 100 along the radial directions of the bar or pipe material 100.

Referring to FIGS. 1, 2, 7, and 8, in an embodiment, the three driving members 2 have the same structure. Only one driving member 2 is described for its specific structure, and the specific structure of the other two driving members 2 will not be repeatedly described.

Each driving member 2 includes a motor 21 and a transmission assembly 22. The transmission assembly 22 includes an input member 221 and an output member 222. The input member 221 includes an input transmission shaft 2211 and an input gear 2212 coaxially connected with each other. The motor 21 drives the input member 221 to rotate. In an embodiment, the input transmission shaft 2211 is an extension of a power output shaft of the motor 21 or coaxially mounted on the power output shaft of the motor 21. The input member 221 drives the output member 222 to synchronously move. The output member 222 is drivably connected to a corresponding striking block 11, thereby driving the striking block 11 to move.

Figure 7:
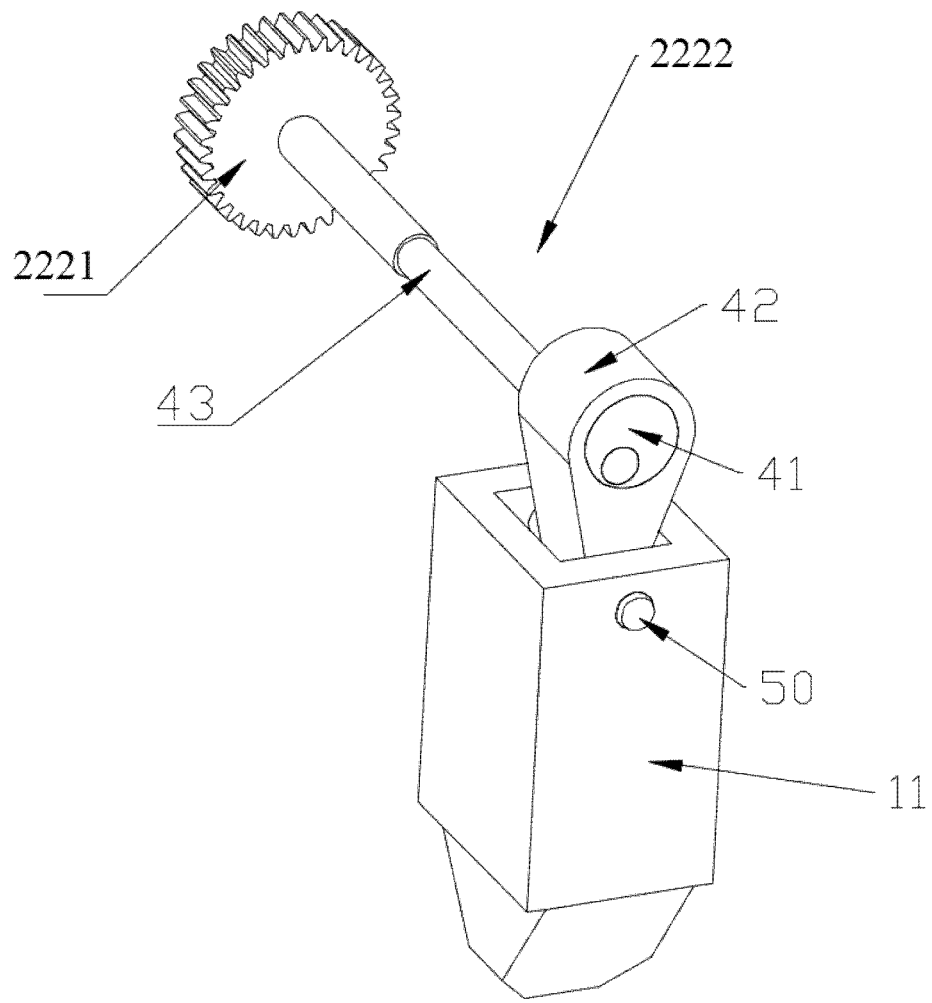
FIG. 7 is a schematic perspective view of a striking block and an output member in an embodiment of the present disclosure.
Figure 8:
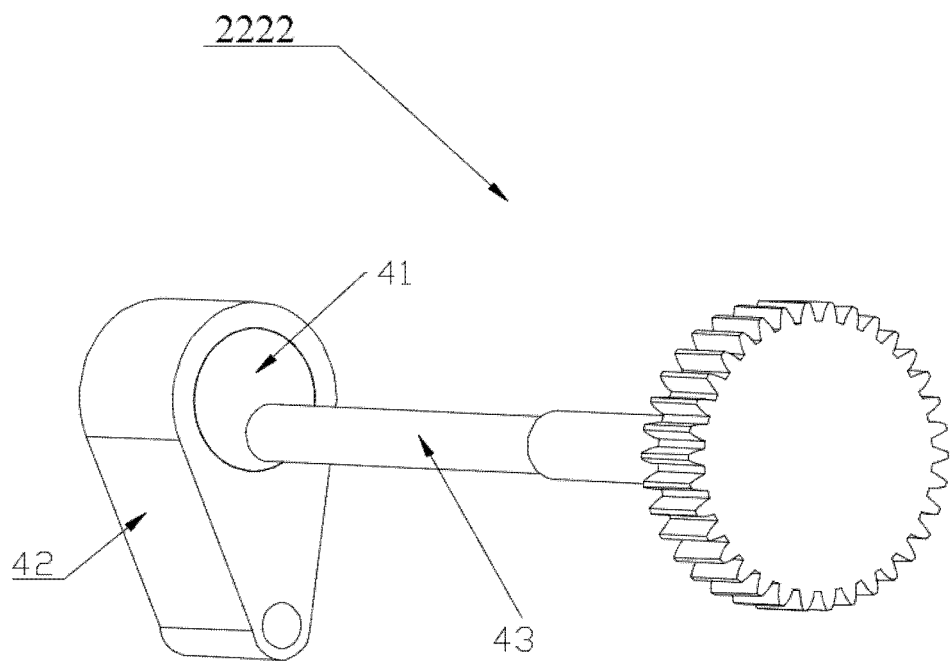
FIG. 8 is a schematic perspective view of the output member in an embodiment of the present disclosure.

Referring to FIGS. 7, and 8, the output member 222 includes an output gear 2221 and an eccentric output assembly 2222. The motor 21 drives the input gear 2212 to rotate. The input gear 2212 is meshed with the output gear 2221, and drives the output gear 2221 to rotate. The output gear 2221 of the output member 222 drives the eccentric output assembly 2222. The eccentric output assembly 2222 is hinged with the striking block 11 through a pin 50. Through the eccentric output assembly 2222, the motor 21 drives the striking block 11 to reciprocate in the corresponding groove 122.

In an embodiment, the eccentric output assembly 2222 includes an eccentric 41, an eccentric connecting rod 42, and an output transmission shaft 43. The output transmission shaft 43 is fixedly connected to the eccentric 41 at one end and fixedly connected to the output gear 2221 at the other end. The larger end of the eccentric connecting rod 42 is rotatably sleeved outside the eccentric 41. The smaller end of the eccentric connecting rod 42 is hinged with the striking block 11 through the pin 50. The output gear 2221 drives the eccentric 41 to rotate through the output transmission shaft 43. The eccentric output assembly 2222 converts rotary of the output gear 2221 into linear reciprocating motion of the striking block 11, so that the striking block 11 is capable of reciprocatingly sliding in the groove 122.

Figure 6:
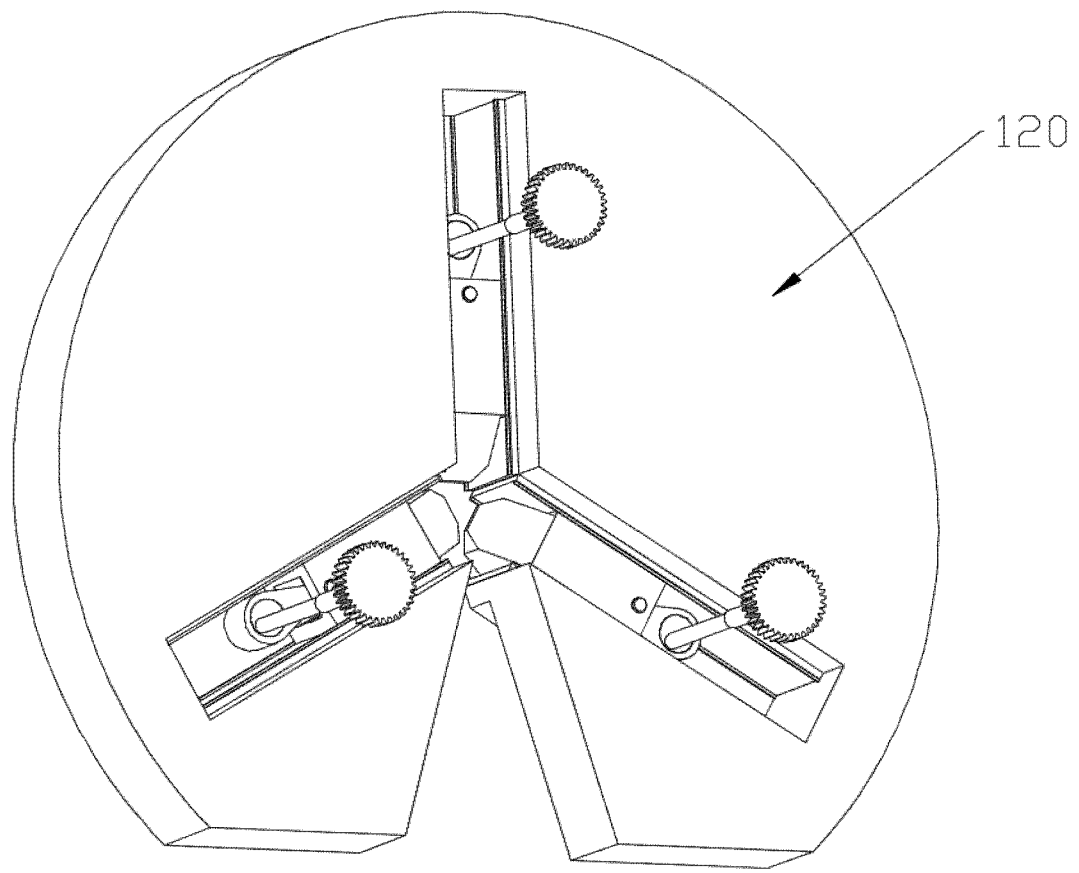
FIG. 6 is a schematic perspective view of the blanking assembly without showing a rear cover of the housing in the embodiment of the present disclosure.

Referring to FIG. 5, the three output members 222 are respectively partially located in the three grooves 122, in a trisectional arrangement at an interval of 120 degrees along the circumference of the front cover 120. Specifically, the three output transmission shafts 43 of the three eccentric output assemblies 2222 extend in the axial direction of the front cover 120, protrude out from the rear cover 121 through three through holes thereof, and are rotatable with respect to rear cover 121. The rear cover 121 fixes the positions of the three output members 222. The three output gears 2221 are located outside the rear cover 121. Referring to FIG. 6, one end of each output transmission shaft 43 extends through the groove 122 and fixedly connected to the eccentric 41 in the groove 122. The eccentric output assemblies 2222 are located at the outer ends of the grooves 122, close to the circumference of the front cover 120, and the striking blocks 11 are located at the inner ends of the grooves 122, close to the center of the front cover 120.

In an embodiment, the motors 21 are three-phase asynchronous motors 21. The three-phase asynchronous motors 21 have a simple structure, high operation reliability, light weight, and low price, and have better working performance and less material consumption compared with single-phase asynchronous motors.

In other embodiments, the motors 21 can be DC motors 21 or other types of motors 21.

In an embodiment, the blanking machine 10 further includes a programmable logic controller (PLC) to control the three motors 21 to actuate one after another at predetermined time intervals, so that the three striking blocks 11, driven by the three motors 21, alternatively and repeatedly strike the bar or pipe material 100 inserted into the blanking machine 10.

Referring to FIGS. 3 and 4, in an embodiment, the blanking assembly further includes a pair of slide rails 123 installed in each of the grooves 122. The three identical striking blocks 11 are slidably installed in the three identical pairs of sliding rails 123, respectively. The number of the striking blocks 11 is an odd number. The three striking blocks 11 are evenly distributed along the circumference direction and alternatively strike the bar or pipe material 100. Only one striking block 11 strikes one end of the bar or pipe material 100 at one time to ensure that the bar or pipe material 100 is subject to only one direction striking force at one time and is subject to uniformly cycling stresses. Under the action of the eccentric output assemblies 2222, the three identical striking blocks 11 respectively reciprocate along the three sliding rail pairs 123.

Figure 9:
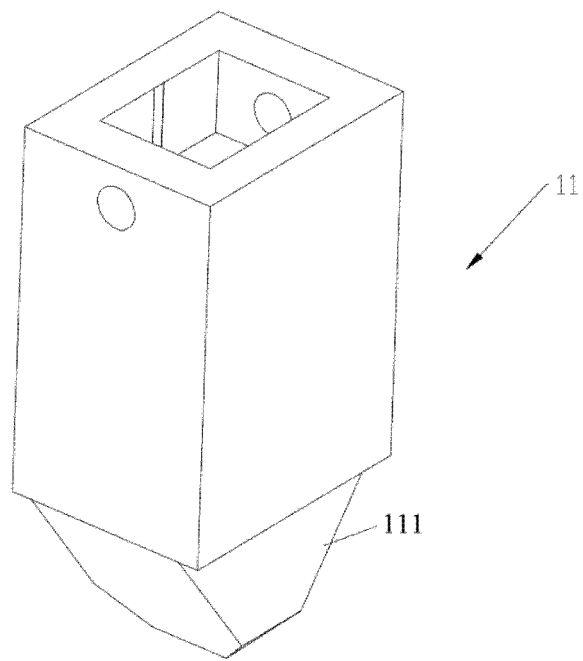
FIG. 9 is a schematic perspective view of the striking block in an embodiment of the present disclosure.
Figure 10:
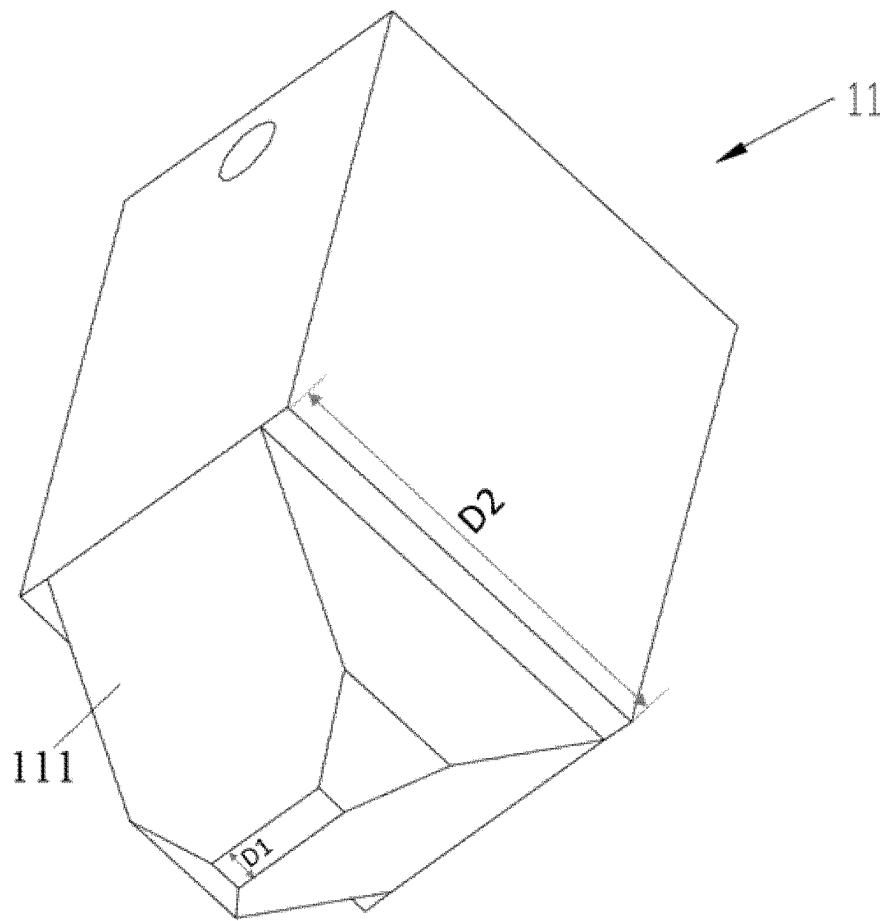
FIG. 10 is a schematic perspective view of the striking block in the embodiment of the present disclosure from another angle of view.

Referring to FIGS. 9 and 10, the end of the striking block 11 is a striking head 111, and the striking head 111 has a tapered polyhedron with multiple faces, which reduces the contact area when striking the bar or pipe material 100. The striking head 111 has a striking surface in the shape of rectangle, and a size D1 (i.e., a width) of the striking surface is 5%-10% of the size D2 of the body of the striking block 11 along the same direction. Before insertion into the blanking assembly 1, the bar or pipe material 100 is previously scored with a V-shaped notch 102 (FIG. 2) along the circumference of the outer surface of the bar or pipe material 100. The V-shaped notch 102 is circularly scored on the bar or pipe material 100 and located at a position from which the bar or pipe material 100 is to be cut. One end of the bar or pipe material 100 is inserted to the center of the three striking blocks 11 to be alternatively and cyclically struck by the three striking blocks 11. Under the striking, the bar or pipe material 100 is to be fractured from the V-shaped notch 102. Maximizing the distance between the struck position (i.e., the end) of the bar or pipe material 100 and the V-shaped notch 102, which maximizes the arm of the force, leads to a maximum force applied to the V-shaped notch 102, thereby promoting the rapid initiation and steady extension of micro-cracks in the bar or pipe material 100 until the bar or pipe material 100 is fractured caused by material fatigue. It is ensured that the bar or pipe material 100 is less deformed at the struck position, has a flat fracture surface, and is retained with high straightness of the bar or pipe material 100, thereby achieving precise separation and avoiding secondary processing caused by unqualified blanking quality. The fatigue fracture blanking method has a high blanking efficiency, no waste generated, and high utilization of raw materials, which is an environmental friendly and pollution-free method. The blanking machine has the advantages of simple structure, wide blanking range, low energy consumption, economy, and practicality.

Figure 11:
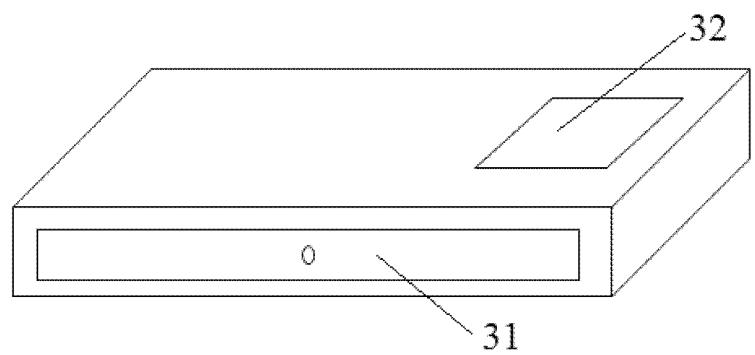
FIG. 11 is a schematic perspective view of a base in an embodiment of the present disclosure.

Referring to FIG. 11, in an embodiment, the base 3 has a cavity structure with a drawer 31 mounted therein. An upper surface of the base 3 is provided with a collection port 32 for collecting a bar or pipe material section separated from the bar or pipe material 100.

The working principle of the above-described blanking machine 10 is as follows. The blanking machine 10 is configured to blank the bar or pipe material 100, i.e., to separate the bar or pipe material section from the bar or pipe material 100 by the fatigue fracture at the position of the V-shaped notch 102. The bar or pipe material 100 with the V-shaped notch 102 is placed at the center of a circle defined by the three striking blocks 11, and in an embodiment, is placed at the hollow center of the housing 12. The three striking blocks 11 strike one end of the bar or pipe material 100 in sequence at the same time interval and at a high frequency, so that the cracks initiate at the V-shaped notch 102 of the bar or pipe material 100 and expand until the bar or pipe material 100 is fractured, thereby completing the blanking. In an embodiment, the depth of the V-shaped notch 102 is 0.5 mm to 1 mm, and the striking frequency is 40 Hz to 60 Hz.

In an embodiment of the present disclosure, the disc shaped housing 12 is vertically mounted on the upper surface of the base 3, so that the axial direction of the housing 12 is in the horizontal direction, and the radial direction of the housing 12 is in the vertical direction; the lower part of the housing 12 has a V-shaped opening 124 (as shown in FIG. 3) cooperatively defined by the front and rear covers 120, 121. The collection port 32 is located below the V-shaped opening 124, so that the bar or pipe sections separated from the bar or pipe material 100 can fall through the V-shaped opening 124 and enter the drawer 31 through the collection port 32. The three striking blocks 11 located in the housing 12 are driven by the three driving members 2 respectively. Only one striking block 11 strikes the bar or pipe material 100 at one time; the three striking blocks 11 sequentially strike the bar or pipe material 100 along the circumference of the bar or pipe material 100; the three striking blocks 11 strike the bar or pipe material 100 in sequence at the same time interval and at a high frequency. The bar or pipe material 100 is subject to uniform cycling stresses along the circumference through the three driving members 2, so that the cracks are initiated at the V-shaped notch and expanded, finally lead to fatigue fracture. The blanking method and machine reduce the deformation of the blanked bar or pipe material 100 and produce a flat fracture surface, thereby achieving precise material separation and avoiding secondary machining caused by unqualified blanking quality.

The present disclosure provides a blanking method for the bar or pipe material, including the following steps:

S1, pre-scoring a bar or pipe material 100 with a V-shaped notch along the circumference of an outer surface of the bar or pipe material 100;

S2, placing the bar or pipe material 100 at the center of a circle defined by the three striking blocks 11; and S3, turning on the motor 21 of the driving member 221 to drive the three striking blocks 11 to strike one end of the bar or pipe material 100 in sequence at the same time interval and at a high frequency, so that the cracks initiate at the V-shaped notch of the bar or pipe material 100 and expand until the bar or pipe material 100 is fractured, thereby completing the blanking.

Only one striking block 11 strikes the rod tube 100 at a time when the three striking blocks 11 strike the bar or pipe material 100 along the circumference of the bar or pipe material 100, and the three striking blocks 11 strike the bar or pipe material 100 in sequence at the same time interval at high frequency.

Figure 12:
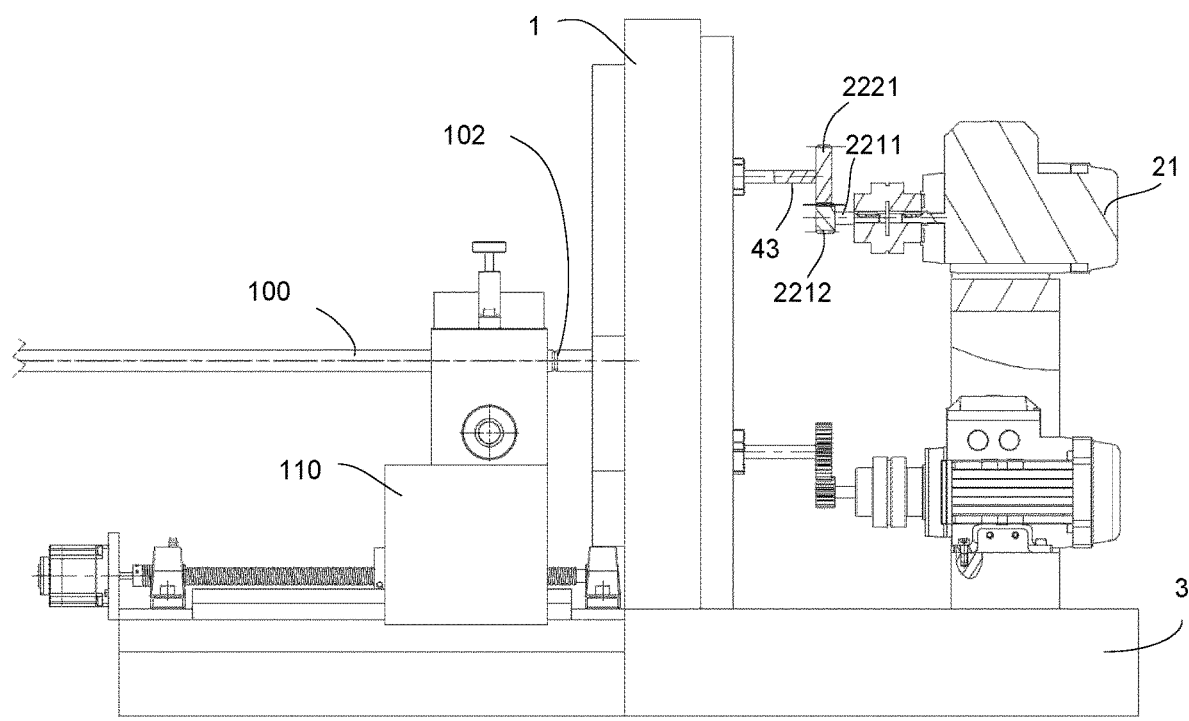
FIG. 12 is a schematic perspective view of a clamping apparatus clamping a bar or pipe material during a blanking process in an embodiment of the present disclosure.

Referring to FIG. 12, a clamping apparatus 110 is provided. The step S2 of the method can include steps of inserting one end of the bar or pipe material 100 to the center of the circle defined by the three striking blocks 11; and holding and fixing another end of the bar or pipe material 100 by the clamping apparatus 110. During the striking of the striking blocks 11, the bar or pipe material 100 fixed by the clamping apparatus 110 is not rotated around its axis.

It can be understood that in some embodiments, the numbers of the striking blocks 11, the grooves 122, the pairs of slide rails 123, and the driving members 2 are not limited to three and can be four or more.

The foregoing descriptions are only some embodiments of the present disclosure, and are not intended to limit the present disclosure. For those skilled in the art, the present disclosure can be modified and changed in a various manner. Any modification, equivalent alternative, improvement, and the like made within the spirit and principle of this present disclosure shall be included in the protection scope of this present disclosure.

What is claimed is:

1. A blanking machine comprising:
   a base;
   a blanking assembly comprising:
      a housing defining a plurality of radially distributed grooves;
      a plurality of pairs of slide rails respectively installed in the grooves; and
      a plurality of striking blocks respectively slidably installed on the pairs of slide rails; and
   a plurality of driving members configured to respectively drive the striking blocks to reciprocate along the slide rails to strike a material to be processed,
   wherein each of the driving members comprises a motor and a transmission assembly; the transmission assembly comprises:
   an input transmission shaft coupled to the motor;
   an input gear mounted on the input transmission shaft;
   an output gear meshed with the input gear; and
   an eccentric output assembly mounted on the output gear, hinged with one of the striking blocks through a pin, the motor being configured to drive the one of the striking blocks through the eccentric output assembly to reciprocatingly move the one of the striking blocks in one of the grooves;

wherein an end of each of the striking blocks is a striking head having a rectangular striking surface, and a width of the rectangular striking surface is 5%-10% of a size of a body of the each of the striking blocks along a width direction of the rectangular striking surface;

wherein a lower part of the housing is provided with an opening extending from a center of the housing to a lower edge of the housing, and an upper surface of the base is provided with a collection port located below the opening, the collection port is communicated with the opening.

2. The blanking machine according to claim 1, wherein the blanking assembly and the driving member are both mounted on the base.

3. The blanking machine according to claim 2, wherein a drawer is installed in the base.

4. The blanking machine according to claim 1, wherein the grooves are evenly distributed in the housing.

5. The blanking machine according to claim 4, wherein the grooves are radially extended from the center of the housing; the grooves are communicated with each other at the center of the housing.

6. The blanking machine according to claim 1, wherein the eccentric output assembly comprises:
an eccentric;
an eccentric connecting rod; and
an output transmission shaft;
wherein one end of the output transmission shaft is fixedly connected to the output gear, and another end of the output transmission shaft is fixedly connected to the eccentric; one end of the eccentric connecting rod is rotatably sleeved outside the eccentric, and another end of the eccentric connecting rod is hinged with the one of the striking blocks through the pin.

7. The blanking machine according to claim 6, wherein the housing comprises a front cover and a rear cover, the grooves are defined in the front cover; the rear cover fixes position of the eccentric output assembly.

8. The blanking machine according to claim 7, wherein the output transmission shaft extends in an axial direction of the front cover, protrudes out from the rear cover through a through hole, and is rotatable with respect to the rear cover.

9. The blanking machine according to claim 7, wherein the eccentric output assembly is located adjacent to an edge of the front cover, and the each of the striking blocks is located adjacent to the center of the front cover.

10. A method for blanking a bar or pipe material by using the blanking machine according to claim 1, the method comprising following steps:
pre-scoring the bar or pipe material with a V-shaped notch along the circumference of an outer surface of the bar or pipe material;
placing the bar or pipe material at the center of a circle defined by the plurality of striking blocks; and
allowing the plurality of driving members to drive the plurality of striking blocks to strike one end of the bar or pipe material in sequence at the same time interval and at a relatively high frequency, so that cracks are initiated at the V-shaped notch of the bar or pipe material and expanded until the bar or pipe material is fractured.

11. The method according to claim 10, wherein a depth of the V-shaped notch is ranged from 0.5 mm to 1 mm.

12. The method according to claim 10, wherein a frequency of the striking is ranged from 40 Hz to 60 Hz.

\* \* \* \* \*